Oct. 9, 1951     L. S. WILLIAMS     2,570,621
INDICATION PROJECTOR FOR WEIGHING SCALES
Filed Aug. 4, 1947     3 Sheets-Sheet 1
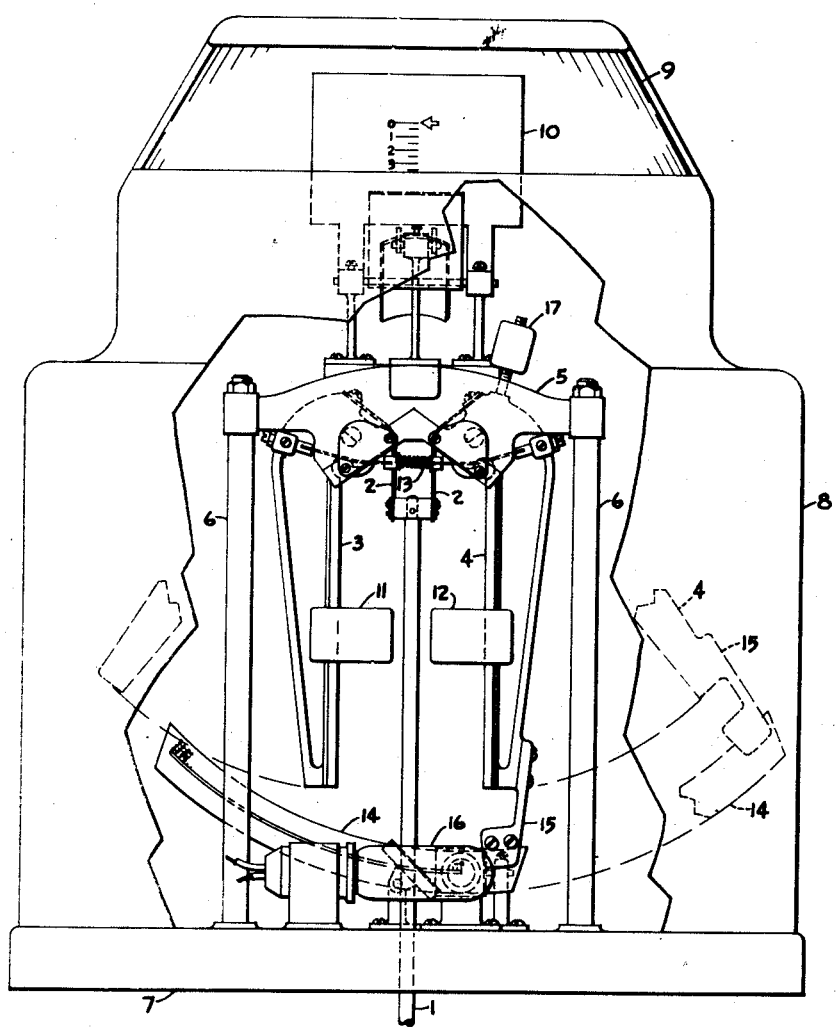
*Fig. I*
INVENTOR.
Lawrence S. Williams
BY
Marshall and Marshall
ATTORNEYS Oct. 9, 1951 L. S. WILLIAMS 2,570,621
INDICATION PROJECTOR FOR WEIGHING SCALES
Filed Aug. 4, 1947 3 Sheets-Sheet 2
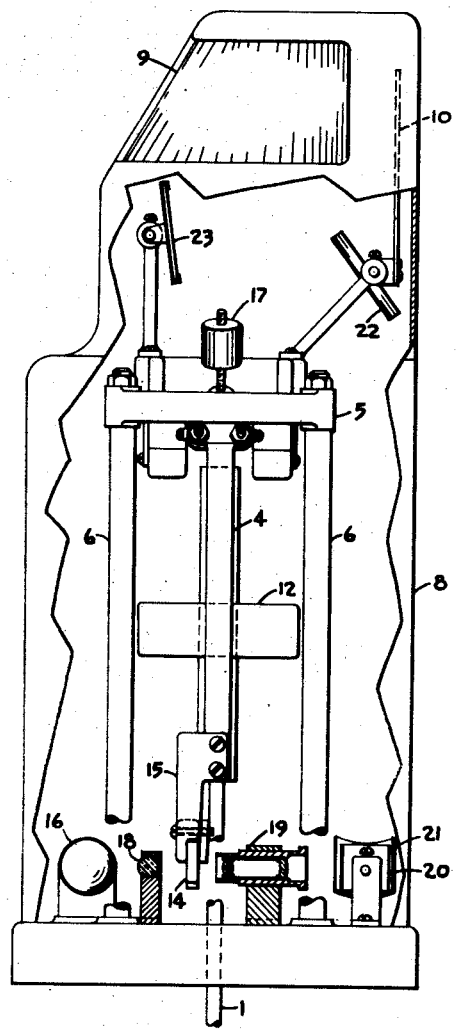
Fig. II
INVENTOR.
Lawrence S. Williams
BY
Marshall and Marshall
ATTORNEYS Oct. 9, 1951   L. S. WILLIAMS   2,570,621
INDICATION PROJECTOR FOR WEIGHING SCALES
Filed Aug. 4, 1947   3 Sheets-Sheet 3
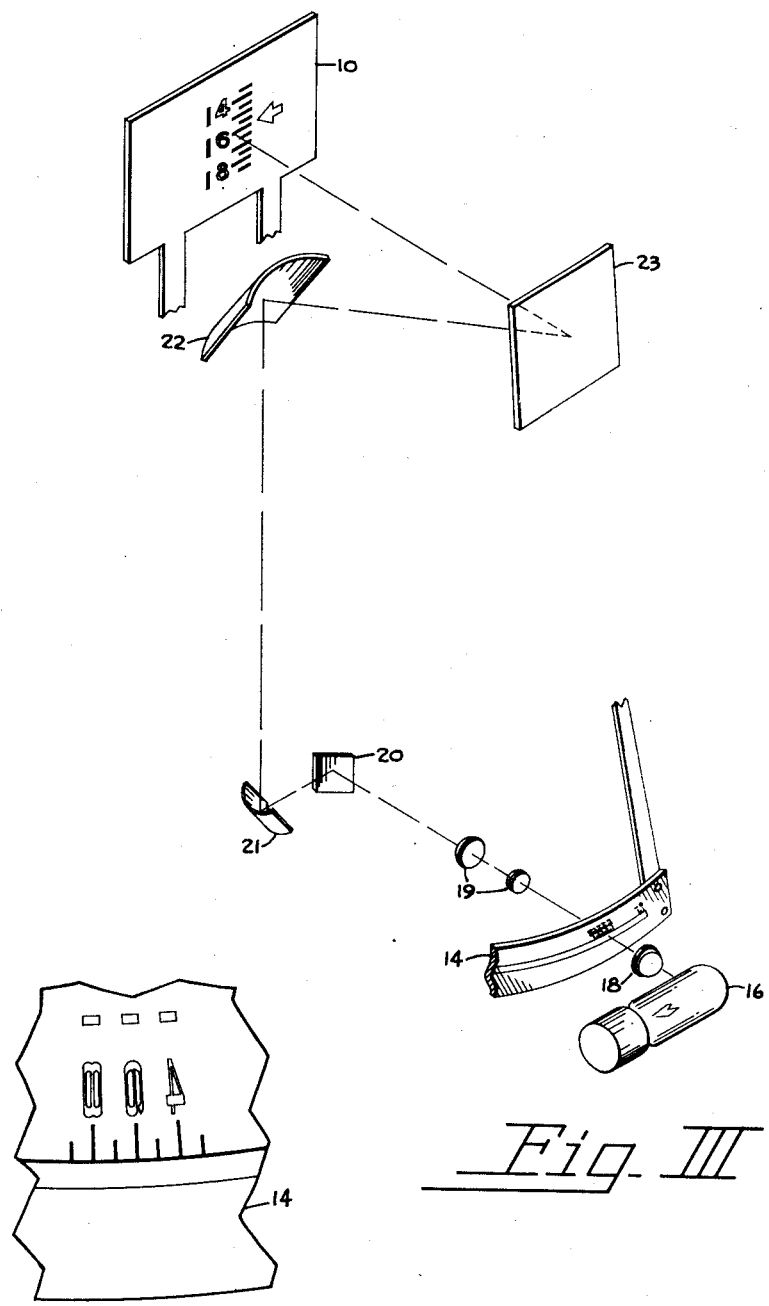
Fig. III
Fig. IV
INVENTOR.
Lawrence S. Williams
BY
Marshall and Marshall
ATTORNEYS Patented Oct. 9, 1951

2,570,621

UNITED STATES PATENT OFFICE 2,570,621

INDICATION PROJECTOR FOR WEIGHING SCALES

Lawrence S. Williams, Toledo, Ohio, assignor to Toledo Scale Company, Toledo, Ohio, a corporation of New Jersey Application August 4, 1947, Serial No. 766,079

2 Claims. (Cl. 88—24)

This invention relates to weighing scales employing optical apparatus for producing a magnified projected image of the weight indication and in particular to apparatus for securing a brilliant image without using an extremely high light intensity at the projection chart.

Weighing scales in which the indication of weight is projected onto a viewing screen have been constructed. It has been found necessary to shield the viewing screens of these scales from other light sources in order that the projected indicia could easily be seen. Any attempts to raise the brilliancy of the image by increasing the power of the light source resulted in overheating the projection chart.

The principal object of this invention is to provide a projection system for a weighing scale which system provides a brilliant sharply defined image of the indicia without requiring a high power light source or high light intensity at the projection chart.

Another object of the invention is to provide a projection system in which the projection chart need not be precisely aligned in a direction transversely to its direction of movement.

The foregoing objects and other incidental advantages are attained by employing a projection chart in which the indicia are distorted by great enlargement in a direction transversely to the path of movement of the chart in combination with a projection system the magnification of which is large along the direction of movement of the chart and which is small in a transverse direction so that the distorted indicia of the weighing scale chart are projected in normal proportions on the viewing screen.

A weighing scale incorporating a preferred embodiment of the invention is illustrated in the accompanying drawings.

In the drawings:

Figure I is a front elevation, with part of the housing broken away, of a weighing scale embodying the improved projection system.

Figure II is a side elevation, with the housing partially broken away and some parts shown in section, of the improved weighing scale.

Figure III is a schematic view illustrating the relationship of the various elements of the projection system.

Figure IV is a greatly enlarged fragmentary detail of a portion of the projection chart.

These specific figures and the accompanying description are intended merely to illustrate the invention but not to impose limitations on the claims.

Optical projection of the indication of a weighing scale is employed to give a great apparent movement of the weight indicia so that highly accurate readings may easily be made. If the magnification produced by the projection system is the same along both axes of the object or image, the intensity of the light at the viewing screen is equal to the intensity of the light at the projection chart divided by the square of the magnification ratio. If the magnification ratio is large (it is usually 20 to 1 or greater) it is readily apparent that the light intensity on the screen is not more than two-tenths of one per cent of the light intensity at the projection chart. Inasmuch as it is readily possible to illuminate a relatively long strip of the projection chart with little increase in power of the light source it is desirable to project such a strip, the narrow dimension of which is parallel to the movement of the chart, as a generally square image on the viewing screen. The projection system to accomplish this result has a high magnification along one axis of the image and a low magnification along the other axis. The high magnification is substantially equal to the magnification ordinarily employed in projected indication weighing scales while the low magnification may be in the order of ten per cent or less of that amount. The light intensity which is inversely proportional to the product of the linear magnifications, i. e. the ratio of areas of the chart and image, is thus increased in direct proportion to the decrease in magnification along the one axis. Since the light intensity at the viewing screen is limited chiefly by the light intensity that the projection chart will stand without overheating it is possible to secure a gain of 10 to 1 or more in light intensity at the viewing screen over the maximum obtainable with the projection systems ordinarily employed.

Referring now to the accompanying figures, forces from loads to be weighed are transmitted from a load receiver to a steelyard rod 1 that is suspended from power ribbons 2 overlying power sectors of a pair of load counterbalancing pendulums 3 and 4. The pendulums 3 and 4 are pivotally mounted in a bridge 5 that is supported at the upper ends of four posts 6 erected from a base 7 of the load counterbalancing mechanism. A housing 8 having a transparent viewing window 9 encloses the pendulum weighing mechanism as well as an optical system for projecting weight indicia onto a viewing screen 10 that is visible through the transparent portion 9 of the housing. The pendulum mechanism is described in detail in a co-pending application Serial No. 731,284, filed February 27, 1947, and the particular pivot structure used to support the pendulums 3 and 4 from the bridge 5 is shown in detail in U. S. application Serial No. 658,039, filed March 29, 1946. In this particular form of pendulum mechanism the load applied through the steelyard rod 1 is counterbalanced chiefly by the restoring moment of pendulum weights 11 and 12 and in part by the load counterbalancing effort of a spring 13 that is connected between flexible ribbons overlying concentric sectors on the pendulum bodies. The dimensional relationship of the various sectors on the pendulum bodies, the location of the weights 11 and 12 and the tension and rate of the spring 13 are selected so that the pendulums 3 and 4 rotate through equal angles for equal increments of load.

A projection chart 14 that is mounted in a bracket 15 depending from the lower end of the pendulum 4 is provided with transparent indicia that are carried through the path of an optical system including a light source 16. A counterweight 17 is mounted on the upper end of the pendulum body 4 to exactly balance the weight of the projection chart 14 and bracket 15.

Referring to Figures II and III, light from the light source 16 passes through a condensing lens 18, a portion of the chart 14 and a projection lens 19. The projection lens 19 comprises a plurality of elements and is constructed to produce a real image in space near a first plane mirror 20 that serves to deflect the optical path from a horizontal direction fore and aft of the scale to a horizontal direction parallel to the back of the scale. After leaving the plane mirror 20 the light is reflected by a first concave cylindrical mirror 21 that directs the optical axis to a vertical line parallel to the back of the housing 8. At a point above the bridge 5 and below the viewing screen 10 a second concave cylindrical mirror 22 intercepts the light beam and directs it to a second plane mirror 23 which, in turn, directs it to the viewing screen 10. The effective focal length of the first cylindrical mirror 21 is selected so that lines of the real image formed by the projection lens parallel to the vertical axis of the image are focused as lines on the viewing screen 10. Since this mirror is located near the real image formed by the projection lens 19 and since the distance from the cylindrical mirror 21 to the viewing screen 10 is much larger, a high ratio of magnification is obtained. The lines of the image that are magnified and focused into lines by the first cylindrical mirror 21 are substantially perpendicular to the movement of the chart so that a large apparent chart movement is obtained.

The cylindrical mirror 22 and the plane mirror 23 do not affect the magnification afforded by the first cylindrical mirror 21, inasmuch as the lines so magnified are transverse to the axis of the second cylindrical mirror whereby, in respect to these lines, the second cylindrical mirror performs the same as a plane mirror. Lines parallel to the other axis of the image, i. e., lines parallel to the path of movement of the projection chart 14, are focused by the second cylindrical mirror 22 as lines on the viewing screen 10. Inasmuch as the cylindrical mirror 22 is approximately midway between the real image formed by the projection lens and the viewing screen 10 it serves to focus the lines without producing any appreciable magnification.

If the indicia on the chart 14 were of normal proportions the projected and magnified indicia on the viewing screen 10 would appear very tall in comparison with their widths. This effect is eliminated by making the indicia on the chart 14 very wide in comparison with their height. Figure IV shows a fragment of the chart in which the indicia are shown exaggerated in width so that after projection they appear in normal proportions.

Inasmuch as the area covered by each of the indicia on the chart is greatly increased by widening the indicia while the size of the projected image on the viewing screen 10 is not affected, it follows that the intensity of light on the viewing screen is much greater than it would be if the indicia were displayed in normal proportion on the projection chart 14.

While a projection system employing concave cylindrical mirrors has optical elements having cylindrical characteristics other types of cylindrical optical elements such as cylindrical lenses or convex cylindrical mirrors may be employed to achieve the same over-all results. The projection lens 19 must, of course, be varied to match the different types of lens systems employing the cylindrical elements. Thus any optical element producing astigmatic magnification may be said to have cylindrical characteristics and any pair of such elements may be combined in a system such that sharp focus may be obtained while the magnification along the various axes of the image varies.

Various modifications may be made in the arrangement of the weighing scale and the optical elements without sacrificing the advantages accruing from confining the high magnification of the projection system to the direction of movement of the weighing scale indicia.

Having described the invention, I claim:

1. In a weighing scale employing optically projected weight indication, in combination, a projection chart that is carried by weighing mechanism and that has limited light absorbing capacity, a series of indicia on the chart, said indicia being greatly enlarged in a direction transverse to the path of the chart, a light source for projecting a beam of light through the chart, a screen, and a projection lens system between the chart and the screen comprising a first cylindrical optical element of short focal length located near the chart for focusing images on the screen of lines on the chart extending transverse to the path of the chart and a second cylindrical element of long focal length for focusing images of lines on the chart extending along the path of the chart, the plane containing the optical axis and the axis of one of the cylindrical optical elements being at substantially ninety degrees rotation about the optical axis from the corresponding plane of the other cylindrical optical element, whereby the indicia of the chart are highly magnified only in the direction of travel of the chart.

2. In a weighing scale employing optically projected weight indications from a chart having limited light absorbing capacity, in combination, a light source of limited brilliance, indicia on the chart, said indicia being distorted by great expansion in a direction transverse to the path of movement of the chart, a screen, a first cylindrical optical element located near the chart in an optical path from the chart to the screen, a second cylindrical optical element located in the optical path intermediate the first element and the screen, the plane containing the optical axis and the axis of one of the cylindrical optical elements being at substantially ninety degrees rotation about the optical axis from the corresponding plane of the other cylindrical optical element, said first element being adapted to focus lines extending along the expanded direction of the indicia, said second element being adapted to focus lines extending the short way of the indicia at a relative magnification that compensates for the expansion of the indicia on the chart and removes the distortion from the projected image.

LAWRENCE S. WILLIAMS.

REFERENCES CITED

The following references are of record in the file of this patent:

UNITED STATES PATENTS

| Number | Name | Date |
|---|---|---|
| 1,259,711 | Allison | Mar. 19, 1918 |
| 1,357,731 | Schaper | Nov. 2, 1920 |
| 1,502,443 | Schaper | July 22, 1924 |
| 1,669,027 | Seymour | May 8, 1928 |
| 1,785,347 | Herrschaft | Dec. 16, 1930 |
| 1,829,633 | Chretien | Oct. 27, 1931 |
| 2,084,795 | Donle | June 22, 1937 |
| 2,252,246 | Bergmans et al. | Aug. 12, 1941 |
| 2,343,621 | Williams | Mar. 7, 1944 |